(12) United States Patent
Okuzu et al.

US012421387B2

(10) Patent No.: US 12,421,387 B2
(45) Date of Patent: Sep. 23, 2025

(54) POLYESTER FILM AND METHOD FOR PRODUCING SAME

(71) Applicant: UNITIKA LTD., Hyogo (JP)

(72) Inventors: Takayoshi Okuzu, Kyoto (JP); Ken Akamatsu, Kyoto (JP); Akiko Hamamoto, Kyoto (JP); Hiroshi Ashihara, Kyoto (JP); Goro Araki, Kyoto (JP); Akito Kajita, Kyoto (JP)

(73) Assignee: UNITIKA LTD., Hyogo (JP)

( * ) Notice: Subject to any disclaimer, the term of this patent is extended or adjusted under 35 U.S.C. 154(b) by 451 days.

(21) Appl. No.: 17/271,322

(22) PCT Filed: Sep. 5, 2019

(86) PCT No.: PCT/JP2019/034909
§ 371 (c)(1),
(2) Date: Feb. 25, 2021

(87) PCT Pub. No.: WO2020/050351
PCT Pub. Date: Mar. 12, 2020

(65) Prior Publication Data
US 2021/0179843 A1    Jun. 17, 2021

(30) Foreign Application Priority Data
Sep. 6, 2018    (JP) .................. 2018-166474

(51) Int. Cl.
| | | |
|---|---|---|
| *C08L 67/02* | (2006.01) | |
| *B29C 55/06* | (2006.01) | |
| *B29C 55/14* | (2006.01) | |
| *B29L 9/00* | (2006.01) | |
| *B29L 31/00* | (2006.01) | |
| *B32B 15/09* | (2006.01) | |
| *B32B 15/18* | (2006.01) | |
| *B32B 15/20* | (2006.01) | |
| *B32B 27/08* | (2006.01) | |
| *B32B 27/36* | (2006.01) | |
| *B65D 25/14* | (2006.01) | |
| *C08G 63/183* | (2006.01) | |
| *C08J 5/18* | (2006.01) | |

(52) U.S. Cl.
CPC .............. *C08L 67/02* (2013.01); *B29C 55/14* (2013.01); *C08G 63/183* (2013.01); *C08J 5/18* (2013.01); *B29C 55/065* (2013.01); *B29C 55/143* (2013.01); *B29L 2009/005* (2013.01); *B29L 2031/717* (2013.01); *B32B 15/09* (2013.01); *B32B 15/18* (2013.01); *B32B 15/20* (2013.01); *B32B 27/08* (2013.01); *B32B 27/36* (2013.01); *B32B 2307/732* (2013.01); *B32B 2307/736* (2013.01); *B32B 2439/66* (2013.01); *B32B 2439/70* (2013.01); *B65D 25/14* (2013.01); *C08G 2150/90* (2013.01); *C08G 2390/40* (2013.01); *C08J 2367/02* (2013.01); *C08J 2467/02* (2013.01); *C08L 2203/16* (2013.01); *C08L 2205/02* (2013.01); *Y10T 428/31681* (2015.04); *Y10T 428/31786* (2015.04)

(58) Field of Classification Search
None
See application file for complete search history.

(56) References Cited

U.S. PATENT DOCUMENTS

| | | | |
|---|---|---|---|
| 2001/0031327 A1 | 10/2001 | Sato et al. | |
| 2003/0069387 A1 | 4/2003 | Majima et al. | |
| 2018/0219192 A1* | 8/2018 | Ijuin | .................... H01M 50/119 |
| 2018/0272594 A1 | 9/2018 | Akamatsu et al. | |
| 2020/0172725 A1* | 6/2020 | Tamari | .................... C08L 67/02 |
| 2021/0198477 A1* | 7/2021 | Goto | ....................... B32B 27/08 |
| 2021/0339973 A1* | 11/2021 | Manabe | ................. B65H 18/28 |
| 2024/0018316 A1* | 1/2024 | Ashihara | ................. B32B 15/09 |

FOREIGN PATENT DOCUMENTS

| | | | |
|---|---|---|---|
| EP | 3352239 A1 * | 7/2018 | |
| EP | 3406421 | 11/2018 | |
| EP | 3406421 B1 * | 10/2020 | |
| JP | 61-209128 | 9/1986 | |
| JP | 9-150492 | 6/1997 | |
| JP | 11-334016 | 12/1999 | |

(Continued)

OTHER PUBLICATIONS

First Office Action in related Japanese application No. 2020-511397 and English translation, (Jun. 22, 2020).

(Continued)

*Primary Examiner* — Vivian Chen
(74) *Attorney, Agent, or Firm* — Csaba Henter; Millen, White, Zelano & Branigan, P.C.

(57) ABSTRACT

A polyester film comprises a polyester (A) composed mainly of polybutylene terephthalate and a polyester (B) composed mainly of polyethylene terephthalate, wherein a mass ratio (A/B) between the polyesters (A) and (B) is 70/30 to 55/45, a dry heat shrinkage rate (A) through heat treatment at 160° C. for 30 minutes is 20% or less in any of four directions on a film surface (0°, 45°, 90° and 135°), a difference between a maximum value and a minimum value of these dry heat shrinkage rates is 5% or less, a dry heat shrinkage rate (B) through heat treatment at 200° C. for 15 minutes is 35% or less in any of the four directions, a difference between a maximum value and a minimum value of these dry heat shrinkage rates is 5% or less, and a thickness variation in the four directions is 10% or less.

17 Claims, No Drawings

(56) References Cited

FOREIGN PATENT DOCUMENTS

| | | |
|---|---|---|
| JP | 2001-246695 | 9/2001 |
| JP | 3247053 | 11/2001 |
| JP | 2002-356568 | 12/2002 |
| JP | 2004-9599 | 1/2004 |
| JP | 2004-148627 | 5/2004 |
| JP | 3753592 | 12/2005 |
| JP | 2006-161054 | 6/2006 |
| JP | 2007-056274 | 3/2007 |
| JP | 2009-131980 A * | 6/2009 |
| JP | 2009-131981 A * | 6/2009 |
| JP | 2009-149065 A * | 7/2009 |
| JP | 2009-221315 | 10/2009 |
| JP | 2012-251140 | 12/2012 |
| JP | 2014-169350 | 9/2014 |
| JP | 2015-131888 | 7/2015 |
| JP | 2015-131888 A * | 7/2015 |
| JP | 2015-189014 | 11/2015 |
| JP | 2017/057773 | 4/2017 |
| JP | 2017-66405 | 4/2017 |
| JP | 2017-226841 | 12/2017 |
| WO | WO 01/00389 A1 * | 1/2001 |
| WO | 2017/057773 | 4/2017 |
| WO | 2017/126563 | 7/2017 |

OTHER PUBLICATIONS

Second Office Action in related Japanese application No. 2020-511397 and English translation, (Oct. 27, 2020).
First Office Action in related Japanese application No. 2019-062050 and English translation, (May 22, 2019).
English machine translation of JP 2014-169350.
English machine translation of JP 2006-161054.
English machine translation of JP 2007-056274.
English machine translation of JP 2002-356568.
English machine translation of JP 2004-148627.
English machine translation of JP 11-334016.
English machine translation of JP 2012-251140.
English machine translation of JP 2015-189014.
International Search Report in PCT/JP2019/034909 dated Nov. 26, 2019.
English language machine translation of JP 2015-131888.
English language machine translation of JP 61-209128.
English language machine translation of JP 2009-221315.
English language machine translation of JP 9-150492.
English language machine translation of JP 2004-9599.
English language machine translation of JP 3247053.

* cited by examiner

POLYESTER FILM AND METHOD FOR PRODUCING SAME

TECHNICAL FIELD

The present invention relates to a polyester film containing a polybutylene terephthalate-based resin and a polyethylene terephthalate-based resin, and a method for producing the same.

BACKGROUND ART

Conventionally, a solvent-type coating material composed mainly of thermosetting resin has been applied to the inner and outer surfaces of a metal can for the purpose of preventing corrosion. However, the solvent-type coating material requires heating at high temperature in order to form a coating film, and a large amount of a solvent is generated at that time, causing problems in terms of work safety and the environment. Accordingly, as a method for preventing corrosion without use of solvent, covering of a metal plate with a thermoplastic resin has been recently proposed. Among the thermoplastic resins, polyesters are particularly excellent in processability, heat resistance, etc., so that development of polyesters covering a metal plate is ongoing.

Examples of the method for covering a metal plate with a thermoplastic resin include a method including melting the thermoplastic resin to be directly extruded onto the metal plate, and a method including thermally press-bonding a thermoplastic resin film to the metal plate directly or through an adhesive. Among the methods, a method using a thermoplastic resin film is considered to be an effective method, due to excellence in workability with easiness in handling of the resin, and excellence in the thickness uniformity of the resin film. Also, since the method using an adhesive has environment and cost problems, a method including directly thermally press-bonding a film is advantageous and attracts attention.

Metal cans covered with a thermoplastic resin film are manufactured by forming and processing a laminated metal plate composed of a thermoplastic resin film laminated on a metal plate such as a steel plate or an aluminum plate (including ones subjected to surface treatment such as plating). The thermoplastic resin film used in such application is required to have good thermal lamination properties with the metal plate, and also have excellent can formability, that is, having no occurrence of peeling, cracks, pinholes of the film during formation of the can. Further, the outer film of the can after formation is required to be excellent in printability and transparency. Also, during retort sterilization and long-term storage, the inner film of the can is required not to cause decrease in adhesiveness to the inner surface of the metal can, and not to cause degradation of performance for covering the inner surface of the metal can, so that the excellent taste and flavor retention properties can be achieved without contact between the contents in the can and the metal of the can.

In the production of such a polyester film for metal plate lamination, for the purpose of imparting thermal lamination properties and improving the can formability, several methods including mixing other components with a polyester, and copolymerizing polyesters have been proposed. The present inventors have previously proposed a biaxially stretched film made of 90 to 45 mass % of polybutylene terephthalate (PBT) or a polyester (A) composed mainly of the same, and 10 to 55 mass % of polyethylene terephthalate (PET) or a polyester (B) composed mainly of the same (Patent Literatures 1 and 2). The film proposed therein has a high crystallinity, and is laminated on a metal plate by thermal lamination to produce a laminated metal plate having excellent processability. Further, the film does not become brittle even after retort sterilization and storage for a long time.

Examples of the method for thermally laminating a polyester film on a metal plate, a method including press-bonding a metal plate preheated to 160 to 250° C. in advance to a film with a roll to produce a thermally press-bonded laminate, and then cooling the laminate to room temperature.

In recent years, for the purpose of increasing the capacity of a can and improving the productivity, the speed of can-making has been enhanced and the size of a thermal lamination machine has been increased. For example, along with the enhancement of the speed of can-making, higher thermal lamination temperature is required in some cases. On the other hand, lower thermal lamination temperature is required in some cases for the purpose of reducing energy costs.

However, since the temperature range in which a polyester film can be thermally laminated on a metal plate is narrow, when the thermal lamination temperature is too high or too low, the resulting laminated metal plate has an insufficient adhesiveness between the polyester film and the metal plate in some cases, and after retort sterilization treatment and long-term storage, the film adhesiveness and covering properties are degraded in some cases.

Also, a stretched film suitable for being attached to a metal foil for cold-molding is disclosed in Patent Literature 3.

The stretched film disclosed in Patent Literature 3, however, lacks physical properties necessary for preventing corrosion of the inner and outer surfaces of a metal can in some cases, due to a large dry heat shrinkage rate when exposed to a high temperature of about 200° C., with a poor balance of dry heat shrinkage rate in each direction.

Accordingly, a polyester film used on the inner and outer surfaces of a metal can is required to enable thermal lamination in a wide temperature range from relatively low temperature to high temperature, such that a laminated metal plate having excellent adhesiveness between a metal plate and the film can be obtained, and to have the following performance properties: excellent formability and processability into a can (can-making properties), excellent transparency after can-making, and being capable of retaining excellent adhesiveness and covering properties even after retort sterilization and long-term storage.

CITATION LIST

Patent Literature

Patent Literature 1: Japanese Patent No. 3247053
Patent Literature 2: Japanese Patent No. 3753592
Patent Literature 3: International Publication No. WO 2017/057773

SUMMARY OF INVENTION

Technical Problem

In order to solve the problem, an object of the present invention is to provide a polyester film which enables thermal lamination treatment with a metal plate in a wide temperature range, and has excellent adhesiveness to a metal plate, excellent formability and processability into a can (can-making properties), excellent transparency after can-making, and excellent adhesiveness and covering properties to a metal plate even after retort sterilization and long-term storage.

Solution to Problem

Through extensive study to solve the problem, the present inventors have found that a polyester film obtained by stretching an unstretched sheet containing two or more polyesters with different crystallinity, i.e., a polyester (A) composed mainly of polybutylene terephthalate and a polyester (B) composed mainly of polyethylene terephthalate with a specified ratio, by a specified method with a specified magnification can be subjected to thermal lamination treatment with a metal plate in a wide range of temperature, and has excellent adhesiveness to a metal plate and has excellent formability and processability into a can (can-making properties), excellent transparency after can-making, and excellent adhesiveness and covering properties to a metal plate even after retort sterilization and long-term storage, so that the present invention has been achieved.

In other words, the summary of the present invention is as follows.

(1) A polyester film including a polyester (A) composed mainly of polybutylene terephthalate and a polyester (B) composed mainly of polyethylene terephthalate,
  wherein a mass ratio (A/B) between the polyesters (A) and (B) is 70/30 to 55/45,
  a dry heat shrinkage rate (A) through heat treatment at 160° C. for 30 minutes is 20% or less in any of four directions on a film surface consisting of a 0° direction as an arbitrary direction, and a 45° direction, a 90° direction and a 135° direction clockwise from the 0° direction, and a difference between a maximum value and a minimum value of these dry heat shrinkage rates is 5% or less,
  a dry heat shrinkage rate (B) through heat treatment at 200° C. for 15 minutes is 35% or less in any of the four directions, and a difference between a maximum value and a minimum value of these dry heat shrinkage rates is 5% or less,
  and a thickness variation calculated from the following equation in the four directions is 10% or less:

Thickness variation (%)=$(T_{max}-T_{min})/T_{ave} \times 100$ $T_{max}$: maximum thickness in four directions of polyester film
  $T_{min}$: minimum thickness in four directions of polyester film
  $T_{ave}$: average thickness in four directions of polyester film.

(2) The polyester film according to item (1), having melting points in the range of 200 to 223° C. and in the range of 225 to 256° C.

(3) A method for producing the polyester film of item (1) or (2) including a stretching step of stretching an unstretched sheet in a flow direction of the sheet (MD stretching) and then stretching the same in a width direction (TD stretching),
  wherein the MD stretching is performed in two or more stages such that the MD stretching magnification (X) represented by a product of stretching magnifications in the respective stages in the MD stretching and the TD stretching magnification (Y) satisfy the following conditions:
  a stretching magnification ratio (X/Y) of 0.82 to 1.10, and an area magnification (X×Y) of 12.00 to 16.00.

(4) A polyester film for lamination on a metal plate, including the polyester film of item (1) or (2).

(5) A polyester film for lamination on a metal can, including the polyester film of item (1) or (2).

(6) The polyester film for lamination on a metal can according to item (5), wherein the polyester film is used for lamination on an inner surface of the metal can.

(7) The polyester film for lamination on a metal can according to item (5), wherein the polyester film is used for lamination on an outer surface of the metal can.

(8) A laminated metal plate including the polyester film for lamination on a metal plate of item (4) laminated on the metal plate.

(9) A metal container obtained by forming the laminated metal plate of item (8).

Advantageous Effects of Invention

A polyester film of the present invention comprises two polyester resins blended at a specified ratio, having excellent uniformity of the dry heat shrinkage rate in four directions at 0°, 45°, 90° and 135° with excellent thickness uniformity. Because of this, even when the temperature range in thermal lamination with a metal plate is wide from relatively low temperature to relatively high temperature, the polyester film of the present invention has excellent adhesiveness to the metal plate, excellent formability and processability into a can (can-making properties), and excellent transparency after formation of the can, and retain excellent adhesiveness and covering properties to the metal plate even after retort sterilization treatment and long-term storage. The polyester film of the present invention may be suitably used as the outer surface film of a metal can due to excellent transparency after formation of the can, and may be suitably used as the inner surface film of a metal can due to excellent covering properties retained even after retort sterilization treatment and long-term storage.

DESCRIPTION OF EMBODIMENTS

Hereinafter, the present invention is described in detail.
The polyester film of the present invention is a polyester film including a polyester (A) composed mainly of polybutylene terephthalate and a polyester (B) composed mainly of polyethylene terephthalate, wherein the mass ratio (A/B) between the polyesters. (A) and (B) is required to be 70/30 to 55/45.

The polyester (A) composed mainly of polybutylene terephthalate of the present invention may not be limited to a homopolybutylene terephthalate composed of butylene terephthalate units only but may be a copolymer containing 80 mol % or more, particularly 90 mol % or more, or still more particularly 95 mol % or more of butylene terephthalate units. In the present invention, the polyester (A) is preferably a copolymer containing 90 mol % or more of butylene terephthalate units, particularly preferably a homopolybutylene terephthalate. With a butylene terephthalate unit content of less than 80 mol %, the polyester (A) has reduced crystallinity or particularly reduced crystallization rate, and the resulting film tends to have reduced adhesiveness and degraded barrier properties after retort treatment.

The copolymerization component of the polyester (A) is not particularly limited, and examples of an acid component include a dicarboxylic acid such as isophthalic acid, phthalic acid, 2,6-naphthalene dicarboxylic acid, 5-sodium sulfoisophthalic acid, oxalic acid, succinic acid, adipic acid, sebacic acid, azelaic acid, dodecanedioic acid, dimer acid, maleic anhydride, maleic acid, fumaric acid, itaconic acid, citraconic acid, mesaconic acid, and cyclohexane dicarboxylic acid, 4-hydroxybenzoic acid, s-caprolactone, and lactic acid.

Also, examples of an alcohol component include ethylene glycol, diethylene glycol, 1,3-propanediol, neopentyl glycol, 1.6-hexanediol, cyclohexane dimethanol, triethylene glycol, polyethylene glycol, polypropylene glycol, polytetramethylene glycol, an ethylene oxide adduct of bisphenol A and bisphenol S.

Further, a small amount of a trifunctional compound such as trimellitic acid, trimesic acid, pyromellitic acid, trimethylol propane, glycerol, and pentaerythritol may be used.

Two or more of these copolymerization components may be used in combination.

From the viewpoint of the heat resistance of the film, the polyester film of the present invention has a melting point derived from the polyester (A) preferably in the range of 200 to 223° C. With a melting point of less than 200° C., the film has reduced heat resistance.

The polyester (B) composed mainly of polyethylene terephthalate of the present invention is not limited to a homopolyethylene terephthalate resin composed of ethylene terephthalate units only, being preferably a copolymer containing 80 mol % or more, particularly 85 to 98 mol %, of ethylene terephthalate units.

As copolymerization components of the polyester (B), both of an acid component and an alcohol component for use may be the same components as in the case of the polyester (A). In particular, it is preferable that the polyester (B) contains isophthalic acid as an acid component. The content of isophthalic acid in the acid components is preferably 2 to 15 mol %, more preferably 3 to 10 mol %.

The polyethylene terephthalate copolymerized with isophthalic acid in the range has an enlarged temperature range for thermal lamination and tends to have improved adhesiveness to a metal plate. While the resulting polyester film tends to have an enlarged thickness variation, the thickness variation can be improved by the production method of the present invention described below (method in which an MD stretching step is performed by two or more multi-stage stretching) so as to obtain excellent adhesiveness and covering properties to a metal plate.

The polyester film of the present invention has a melting point derived from the polyester (B) preferably in the range of 225 to 256° C., more preferably in the range of 230 to 256° C., still more preferably in the range of 235 to 256° C. With a polyester (B) having a melting point of less than 225° C., the resulting film tends to cause whitening or generation of white spots after retort treatment, with reduction in adhesiveness after retort treatment. In particular, with a polyester (B) having a melting point of 225° C. or more, the film has improved heat resistance and adhesiveness after retort treatment and long-term storage, and troubles such as fusion bonding to a jig during processing of a can and fracture in the middle of processing of a can body are effectively reduced.

In the polyester film of the present invention, the mass ratio (A/B) between the polyester (A) and the polyester (B) is required to be 70/30 to 55/45, and in order to obtain sufficient effects of the present invention, the ratio is preferably 67/33 to 58/42, more preferably 63/37 to 60/40.

With a proportion of the polyester (A) in the total mass of the polyester (A) and the polyester (B) of more than 70 mass %, the resulting film has reduced adhesiveness after retort treatment. On the other hand, with a proportion of the polyester (B) of more than 45%, due to the increased proportion of the component having a high melting point in a film, the adhesiveness between the film and a metal plate is reduced in lamination processing of the metal plate at low temperature, and the adhesiveness is also reduced after retort treatment.

In particular, with a proportion of the polyester (A) in the range of 70 to 55 mass %, the laminated metal plate has excellent forming and processability conformability in high-speed high-order drawing and ironing, and the film causes no whitening phenomenon and micro cracks resulting from a void generated by excessive deformation, having excellent adhesiveness to a metal plate, with the adhesiveness and covering properties to the metal plate being good even through long-term storage after retort treatment. As a result, in a can having the film on the inner surface, the metal plate is covered even after long-term storage, so that the can has excellent corrosion resistance (protection of the contents, taste and aroma preservation, and flavor retention). Further, a can having the film on the outer surface generates no rust and has a high glossiness of printed design, so that a product with high commodity value can be obtained. The film on the outer surface has transparency to an extent that does not impair the design of the can itself.

The polyester film of the present invention is required to satisfy the following conditions (1) to (3) at the same time so as to enable the thermal lamination treatment with a metal plate in a wide temperature range.

(1) The dry heat shrinkage rate (A) through heat treatment at 160° C. for 30 minutes is required to be 20% or less in any of the four directions (0°, 45°, 90° and 135°) on a film surface, preferably 5 to 18%, more preferably 10 to 16%. Also, the difference between the maximum value and the minimum value of these dry heat shrinkage rates is required to be 5% or less, preferably 4% or less, more preferably 3% or less.

(2) The dry heat shrinkage rate (B) through heat treatment at 200° C. for 15 minutes is required to be 35% or less in any of the four directions, preferably 10 to 33%, more preferably 15 to 30%. The difference between the maximum value and the minimum value of these dry heat shrinkage rates is required to be 5% or less, preferably 4% or less, more preferably 3% or less.

(3) The thickness variation calculated from the following equation is required to be 10% or less in the four directions, preferably 8% or less, more preferably 7% or less.

$$\text{Thickness variation } (\%) = (T_{max} - T_{min}) / T_{ave} \times 100$$

$T_{max}$: maximum thickness in four directions of polyester film $T_{min}$: minimum thickness in four directions of polyester film $T_{ave}$: average thickness in four directions of polyester film.

Unless the conditions (1) to (3) are satisfied at the same time, the film of the resulting laminated metal plate may have insufficient adhesiveness and covering properties to a metal plate depending on the temperature during thermal lamination, and adhesiveness to the metal plate may be reduced after retort treatment and long-term storage. Further, the laminated metal plate may have reduced formability into a can. The four directions on a film refer to a 0° direction as an arbitrary direction, and 45°, 90° and 135° directions clockwise from the 0° direction. In particular, it is preferable that the flow direction of the film (MD) be 0°.

Subsequently, the method for producing a polyester film of the present invention is described.

Regarding the raw material polyesters for use in producing the film of the present invention, the polyester (A) has an intrinsic viscosity (IV) of preferably 0.75 to 1.6 dl/g, the polyester (B) has an intrinsic viscosity of preferably 0.65 to 1.0 dl/g, and after mixing and melting, the intrinsic viscosity is preferably 0.75 to 1.2 dl/g.

With an intrinsic viscosity of the polyesters less than the range, the film fractures during high-order processing of a laminated metal plate, so that the productivity is extremely reduced. In particular, in the step of drawing and ironing a laminated metal plate in production of a can having a large capacity, the film cannot follow the large deformation processing, so that voids and cracks generate. As a result, even a small impact from the outside leads to peeling from the metal plate and growth of cracks.

Accordingly, in a can using the film on the inner surface, due to the voids and cracks, the contents come in direct contact with the metal of the can to cause reduction in the taste and aroma preservation or cause flavor problem. Also, in a can using the film on the outer surface, the printed appearance is reduced at a part where the film is whitened by the void. Further, due to the voids and cracks, the problem of corrosion of the can may be caused during long-term storage.

On the other hand, with an intrinsic viscosity of the polyesters more than the range, in the step of melting the resin to produce the film, the load applied to a melt extruder increases, so that the production speed needs to be sacrificed or due to the prolonged melt retention time of the resin in the extruder, the reaction between the polyester resins excessively proceeds to degrade the properties of the film, resulting in degradation in physical properties of the laminated metal plate. Further, a polyester having excessively high intrinsic viscosity has a long polymerization time and a long polymerization process, resulting in increase in the costs.

The polymerization method of the raw material polyesters is not particularly limited, and examples thereof include a transesterification method and a direct polymerization method. Examples of a transesterification catalyst include an oxide and an acetate of Mg, Mn, Zn, Ca, Li and Ti. Examples of a polycondensation catalyst include a compound such as an oxide and an acetate of Sb, Ti and Ge. Since the polyester after polymerization contains monomers, oligomers, and by-products such as acetaldehyde and tetrahydrofuran, it is preferable to perform solid-phase polymerization at a temperature of 200° C. or more under reduced pressure or inert gas flow.

In the polymerization of the polyester, additives such as an antioxidant, a heat stabilizer, an ultraviolet absorber, and an antistatic agent may be added on an as needed basis. Examples of the antioxidant include a hindered phenol compound and a hindered amine compound, examples of the heat stabilizer include a phosphorus compound, and examples of the ultraviolet absorber include a benzophenone compound and a benzotriazole compound. Further, in order to inhibit the reaction between the polyesters (A) and (B), it is preferable to add a phosphorus compound as conventionally known reaction inhibitor before polymerization, during polymerization, or after polymerization. It is more preferable that the addition is performed at the end of melt polymerization before solid polymerization.

The polyester film of the present invention is produced through a sheet forming step for forming a melt-kneaded product containing the polyester (A) and the polyester (B) into an unstretched sheet, and then a stretching step of stretching the unstretched sheet in the flow direction of the sheet (MD stretching) and then stretching in the width direction (TD stretching).

In the sheet forming step, a melt-kneaded product containing the polyester (A) and the polyester (B) is formed into a sheet form to obtain an unstretched sheet.

The preparation of the melt kneaded product may be performed by a known method. For example, raw materials including the polyester (A) and the polyester (B) are fed into an extruder having a heating device, and melted by heating to a specified temperature.

In preparation of the melt-kneaded product, for the purpose of improving the process passability during film production and can-making, it is preferable that a small amount of inorganic lubricant such as silica, alumina and kaolin be added to impart slip properties to the film surface. Further, for the purpose of improving the film appearance and printability, for example, a silicone compound may be contained. The amount of the inorganic lubricant added is preferably 0.001 to 0.5 mass % or 0.05 to 0.3 mass %. Also, titanium dioxide in an amount of up to about 20 mass % may be added for the purpose of shielding in combination with the function as lubricant.

The unstretched sheet as a product formed into a sheet may be obtained by extruding the melt-kneaded product with a T-die and cooled and solidified with a casting drum or the like at a temperature controlled to equal to or less than the room temperature.

The average thickness of the unstretched sheet is not particularly limited, usually 50 to 1000 μm, preferably 100 to 800 μm. With an average thickness controlled in the range, the unstretched sheet may be more effectively subjected to a stretching step.

In the present invention, in the stretching step including MD stretching for stretching the unstretched sheet in the flow direction of the sheet and subsequent TD stretching for stretching in the width direction, the MD stretching is required to be performed in two or more stages.

The ratio between the MD stretching magnification (X) represented by a product of stretching magnifications in the respective stages of the MD stretching and the TD stretching magnification (Y), i.e., stretching magnification ratio (X/Y), is required to be 0.82 to 1.10. In the case of producing a polyester film to compose the outer surface of a metal can, the stretching magnification ratio (X/Y) is preferably 1.00 to 1.10, more preferably 1.05 to 1.10, from the viewpoint of the transparency after high-order drawing and ironing. On the other hand, in the case of producing a polyester film to compose the inner surface of a metal can, the stretching magnification ratio (X/Y) is preferably 0.85 to 0.95, more preferably 0.85 to 0.90, from the viewpoints of the adhesiveness between the film and a metal plate and the long-term preservability after retort treatment.

Further, the area magnification (X×Y) is required to be 12.00 to 16.00. In the case of producing a polyester film to compose the outer surface of a metal can, the area magnification (X×Y) is preferably 14.50 to 16.00, from the viewpoint of the transparency after high-order drawing and ironing. On the other hand, in the case of producing a polyester film to compose the inner surface of a metal can, the area magnification (X×Y) is preferably 12.50 to 14.00, from the viewpoints of the adhesiveness between the film and a metal plate and the long-term preservability after retort treatment.

In the production method of a polyester film of the present invention, the MD stretching step is required to be a multi-stage stretching with two or more stages. The MD stretching is usually performed using two or more rolls with difference in peripheral velocity. Use of multi-stage stretching enables the stretching stress to be reduced, so that the load applied to rolls are reduced and the stretching temperature can be reduced. As a result, the film is prevented from being fusion-bonded to a roll or wound around a roll, so that the thickness variation of the film in the flow direction (MD) can be reduced. The MD stretched film with reduced thickness variation in the flow direction (MD) of the film is subjected to TD stretching, so that the thickness variation in the four directions specified in the present invention can be reduced.

In the multi-stage MD stretching, it is preferable that the unstretched sheet before stretching be temperature-controlled in the range of 25 to 60° C. in advance. With a temperature of less than 25° C., the unstretched sheet may be fractured during stretching in some cases, and with a temperature of more than 60° C., the unstretched sheet may wind around a roll.

In the MD stretching in a first stage (MD1 stretching), the stretching temperature is preferably 50 to 80° C., more preferably 55 to 75° C., still more preferably 60 to 70° C.

Also, the stretching magnification in the MD1 stretching is preferably 1.1 to 1.5. With a stretching magnification of 1.1 or less, no stretching effect is exhibited, while with a stretching magnification of more than 1.5, oriented crystallization of the film notably proceeds, so that the stress increases during stretching in the second or later stage, resulting in easy fracture of the film.

Following the first-stage MD stretching (MD1 stretching), a second-stage MD stretching (MD2 stretching) is performed. Further, a third- or later-stage MD stretching may be performed. It is preferable that the MD stretching step be a two-stage to three-stage multi-stage stretching. Hereinafter, an n-th stage MD stretching is referred to as MDn stretching.

The stretching temperature of the MDn stretching is preferably 50 to 80° C., more preferably 55 to 75° C., still more preferably 55 to 70° C.

Also, the stretching magnification of the MDn stretching is preferably 1.2 to 3.5.

It is preferable that the stretching magnification be gradually increased such that the stretching magnification $(X_{n+1})$ in a (n+1)-th stage is higher than the stretching magnification $(X_n)$ in an n-th stage, and it is more preferable that the ratio $(X_{n+1}/X_n)$ be 1.3 to 2.8.

Further, in the multi-stage stretching, the MD stretching magnification (X) represented by the product of the stretching magnifications in the respective stages is preferably 2.5 to 3.8, more preferably 2.8 to 3.5.

As the method for heating a film in the MD stretching step, known methods such as passing a film through heating rolls and infrared heating between rolls for MD stretching may be used alone or in combination. In particular, the method for infrared heating a film between stretching rolls enables the temperature of the stretching rolls to be reduced, so that the film is prevented from being fusion-bonded to a roll or wound around a roll, resulting in further reduction in the MD thickness variation of the film.

The MD stretched film is then successively TD stretched.

The TD stretching temperature is preferably 60 to 100° C., more preferably 70 to 95° C.

The magnification (Y) of the TD stretching is controlled depending on the physical properties required for the final product film, preferably 2.7 or more, more preferably 3.0 or more, particularly preferably 3.6 or more.

In the production method of a polyester film of the present invention, the stretching is required to have a stretching magnification ratio (X/Y) of 0.82 to 1.10, and an area magnification (X×Y) of 12.00 to 16.00. In the case of stretching not satisfying the range of stretching magnification ratio, the resulting polyester film has poor balance of dry heat shrinkage rates in four directions, so that the difference between the maximum value and the minimum value of the heat shrinkage rates tends to exceed the range specified in the present invention, and depending on the area magnification (X×Y) value, the dry heat shrinkage rate in heat treatment at 200° C. for 15 minutes may not satisfy the range specified in the present invention in some cases. Further, a polyester film obtained by stretching with an area magnification (X×Y) value of more than 16.00 is difficult to have a dry heat shrinkage rate satisfying the range specified in the present invention in the heat treatment at 200° C. for 15 minutes, and a polyester film obtained by stretching with an area magnification (X×Y) value of less than 12.00 is difficult to have a thickness variation satisfying the range specified in the present invention, so that the adhesiveness tends to be poor in thermal lamination at low temperature.

The TD stretched film is subsequently subjected to heat relaxation treatment for continuous reduction in the width of the film in order to control heat shrinkage properties of the film. The heat relaxation treatment is performed preferably at 1 to 10% of the lateral stretching magnification. The film is then cooled to a temperature equal to or less than Tg of the film to obtain a biaxially stretched film.

The heat relaxation treatment after stretching is a step required for imparting dimensional stability to the film, and examples of the treatment method may include known methods such as hot air blowing, exposure to infrared, and exposure to microwaves. In particular, hot air blowing is most suitable, accurately achieving uniform heating.

The heat relaxation treatment temperature is preferably 140 to 200° C., more preferably 150 to 190° C., still more preferably 160 to 180° C. With a heat relaxation treatment temperature of less than 140° C., the dry heat shrinkage rate in the four directions in the present invention increases, so that it tends to become difficult to obtain the film of the present invention. With a heat relaxation temperature of more than 200° C., the thermal lamination properties with a metal plate are degraded, so that it tends to become difficult to obtain the film of the present invention.

The polyester film of the present invention may be provided with an adhesive layer by coextrusion, lamination or coating for the purpose of further improving the thermally press-bonding properties with a metal plate and the adhesiveness afterwards. The thickness of the adhesive layer is preferably 1 μm or less in terms of dry film thickness. The adhesive layer is not particularly limited, preferably a thermosetting resin layer made of epoxy resin, polyurethane resin, polyester resin or various modified resins thereof.

On the opposite side of the film to be thermally press-bonded to a metal plate, one or two or more resin layers may be provided in order to improve the appearance of the metal can body and the printability, or improve the heat resistance, retort resistance, etc., of the film. These layers may be provided by coextrusion, lamination or coating.

The laminated metal plate of the present invention includes the film laminated on a metal plate directly or through an adhesive.

Examples of the metal plate on which the film of the present invention is laminated include a steel plate and an aluminum plate, and the metal plate for use may be subjected to chemical conversion treatment such as chromic acid treatment, phosphoric acid treatment, electrolytic chromic acid treatment and chromate treatment, or subjected to various plating treatments with nickel, tin, zinc, aluminum, gunmetal, brass or the like.

Examples of the method for laminating the film on a metal plate include press-bonding the metal plate preheated to 160 to 250° C. to the film by a roll controlled to a temperature lower than that of the metal plate by 30° C. or 50° C. or more to cause thermally press-bonding, and then cooling the laminate to room temperature. Thereby, a laminated metal plate can be continuously produced.

Examples of the method for heating the metal plate include thermal transfer with a heater roll, induction heating, resistance heating and hot air transmission, and thermal transfer with a heater roll is particularly preferred from the viewpoint of equipment cost and simplification of equipment.

As a cooling method after lamination, the laminate may be immersed in a coolant such as water, or may be brought into contact with a cooling roll.

The laminated metal plate obtained by the method has excellent can-making properties and may be directly subjected to processing. Alternatively, the laminated metal plate may be heat treated at a temperature higher than the melting point of the polyester by 10 to 30° C. and then quenched to make a film in an amorphous state, so that higher processability can be imparted.

The metal container of the present invention is obtained by forming the laminated metal plate. The metal container is subjected to processing into a form for use of filling with food and beverage, including a part of a metal container, for example, a can lid formed into a shape subjected to a winding process. The excellent processability of the film of the present invention is exhibited particularly in production of a metal container using a can body component of three-piece can (3P can) subjected to harsh neck-in processing or a can body component of two-piece can (2P can) produced by drawing and ironing.

Having excellent retort resistance, flavor properties and corrosion resistance, the metal container of the present invention is suitable for filling with contents including various processed foods such as coffee, green tea, black tea, oolong tea, and in particular, a highly corrosive acidic beverage (fruit juice beverage) and milk beverage.

EXAMPLES

Next, the present invention is specifically described with reference to Examples.

The raw materials of the film in Examples and Comparative Examples, and the measurement method of characteristic values are as follows.

(Raw Material)
Polyester (A)
A-1: homopolybutylene terephthalate (PBT), IV: 1.08 dl/g, Tm: 223° C., Ti catalyst content: 40 ppm
A-2: polybutylene terephthalate copolymerized with 5 mol % of sebacic acid (PBT/PBSS), IV: 0.92 dl/g, Tm: 217° C., Ti catalyst content: 40 ppm
A-3: polybutylene terephthalate copolymerized with 12 mol % of sebacic acid (PBT/PBS12), IV: 0.95 dl/g, Tm: 204° C., Ti catalyst content: 40 ppm Polyester (B)
B-1: homopolyethylene terephthalate (PET), TV: 0.75 dl/g, Tm: 255° C., Ge catalyst content: 40 ppm
B-2: homopolyethylene terephthalate (PET), IV: 0.64 dl/g, Tm: 255° C., Sb catalyst content: 100 ppm
B-3: polyethylene terephthalate copolymerized with 5 mol % of isophthalic acid (PET/PEI5), IV: 0.81 dl/g, Tm: 233° C., Sb catalyst content: 100 ppm
B-4: polyethylene terephthalate copolymerized with 8 mol % of isophthalic acid (PET/PEI8), IV: 0.73 dl/g, Tm: 228° C., Sb catalyst content: 100 ppm
B-5: polyethylene terephthalate copolymerized with 12 mol % of isophthalic acid (PET/PEI12), IV: 0.65 dl/g, Tm: 219° C., Sb catalyst content: 100 ppm
B-6: polyethylene terephthalate copolymerized with 3.5 mol % of 1,4-cyclohexane dimethanol (PET/CHDM), IV: 0.78 dl/g, Tm: 240° C., Ge catalyst content: 40 ppm (Measurement Method)
A. Measurement Position of Film Each of the physical properties of the film was measured at the central part of a formed polyester film in the width direction.

B. Melting Point (Tm)

The melting point was measured in a heating process at 20° C./minute using a DSC manufactured by Perkin Elmer, Inc. The film was melted and then quenched at a rate of 100° C./minute or more into an amorphous state for use as a measurement sample.

C. Dry Heat Shrinkage Rate

After a polyester film was subjected to moisture conditioning at 23° C., 50% RH for 2 hours, the polyester film was cut in the four directions consisting of a 0° direction as the film flow direction (MD) and at a 45° direction, a 90° direction (TD), and a 135° direction clockwise from MD, so as to collect samples having a length of 100 mm in the measurement direction and a width of 10 mm in the direction perpendicular to the measurement direction (5 pieces in the respective directions) (samples after moisture conditioning 1).

The samples collected were exposed to dry air under conditions at 160° C. for 30 minutes, or at 200° C. for 15 minutes, and then subjected to moisture conditioning in an environment at 23° C., 50% RH for 2 hours (samples after moisture conditioning 2). The sample length was measured after the moisture conditioning 1 and the moisture conditioning 2 to calculate the dry heat shrinkage rate based on the following equation. The average of the calculated values of the 5 pieces was used.

Dry heat shrinkage rate (%)=[((Sample length after moisture conditioning 1)−(Sample length after moisture conditioning 2))/(sample length after moisture conditioning 1)]×100

D. Thickness Variation

After the polyester film was subjected to moisture conditioning in an environment at 23° C., 50% RH for 2 hours, the thickness was measured at 10 points at intervals of 10 mm in each of the four directions consisting of a 0° direction as the film flow direction (MD) and a 45° direction, a 90° direction (TD), and a 135° direction clockwise from MD, i.e., at 40 points in total, using a thickness gauge (HEIDENHAIN-METRO MT1287, manufactured by Heidenhain Co.).

In the measurement values at the 40 points, the maximum thickness is represented by $T_{max}$, the minimum thickness by $T_{min}$, and the average thickness by $T_{ave}$. The thickness variation was calculated from the following equation:

Thickness variation (%)=$(T_{max}-T_{min})/T_{ave}$×100

E. Adhesiveness

A polyester film overlapping a tin-free steel plate having a thickness of 0.21 mm was supplied between a metal roll heated to 190° C. or 200° C. and a silicone rubber roll such that the tin-free steel plate came in contact with the metal roll and the polyester film came in contact with the silicone rubber roll, and through thermobonding at a speed of 20 m/minute under a linear pressure of $4.9 \times 10^4$ N/m for 2 seconds and subsequent cooling by immersion in iced water, a laminated metal plate was obtained.

A laminated metal plate was also obtained in the same manner as described above, except that the preset temperature of the metal roll was controlled to 220° C. and the thermobonding time was changed to 1 second.

From a resulting laminated metal plate, 10 test pieces in a strip form having a width of 18 mm (long side in MD of film, short side in TD of film, ends not laminated, and laminated part having a length of 8 cm or more in MD) were cut out. Subsequently, an adhesive tape specified in JIS Z-1522 was attached to the film surface of the test piece for the measurement of the peel strength thereof through a 180-degree peeling test at a rate of 10 mm/minute using an autograph manufactured by Shimadzu Corporation. In the case of a peel strength of 2.9 N or more, it was observed that the peel interface of the laminated metal plate moved from the polyester film/tin-free steel plate to film cutting resulting from cohesive failure of the polyester film or tension in many cases, so that the evaluation basis for adhesiveness in the present invention was set to 2.9 N. Based on the number of test pieces having a peel strength of 2.9 N or more, the adhesiveness between the polyester film and the tin-free steel plate was evaluated. The number of test pieces having a peel strength of 2.9 N or more is practically 6 or more, preferably 8 or more, more preferably all of the 10.

F. Adhesiveness after Storage Test (at 50° C. for 3 Months)

The laminated metal plate obtained in E described above was subjected to retort treatment at 120° C. for 30 minutes and it was stored at 50° C. for 3 months. Then, from the laminated metal plate, 10 pieces of test pieces in a strip form having a width of 18 mm (long side in MD of film, short side in TD of film) were cut out and subjected to measurement of peel strength in the same manner as in E described above. The adhesiveness between the polyester film and the tin-free steel plate after the storage test was evaluated based on the number of the test pieces having a peel strength of 2.9 N or more in the 10 test pieces in the same manner as in E described above.

G. Can-Making Properties

The laminated metal plate obtained in E described above was subjected to an amorphous treatment by heating at 260° C. for 30 seconds using a hot air oven and then quenching. The laminated metal plate through the amorphous treatment was subjected to drawing and ironing at a rate of 80 strokes/minute into a formed container having a bottom diameter of 65 mm and a height of 250 mm, so that a 2-piece can was made.

The resulting 2-piece can was subjected to retort treatment at 120° C. for 30 minutes, and then the internal part of the can was filled with 1 mass % saline solution. When a voltage of 6V was applied to the can body as positive electrode, the current value was measured to evaluate the can-making properties based on the degree of the defects of the polyester film. The more current flow indicates that the more defects are present. The maximum current value is practically 5 mA or less, preferably 4 mA or less, more preferably 2.2 mA or less.

H. Covering Properties

In the evaluation on the can-making properties in G described above, after retort treatment at 120° C. for 30 minutes, storage at 50° C. for 3 months was performed. After that, the current value was measured in the same manner as in G. In the case of using as an inner surface film, the maximum current value is practically 5 mA or less, preferably 4 mA or less, more preferably 2.2 mA or less, after the storage test at 50° C. for 3 months.

I. Transparency

After a laminated metal plate was obtained by the method described in E described above using a metal plate printed in black (L-value: 14.0), a 2-piece can was made by the method described in G. The L-value of a part printed in black of the metal plate laminated with an outer surface film was measured using a colorimeter (simplified spectrocolorimeter NF333, manufactured by Nippon Denshoku Industries Co., Ltd., light source: F8, visual angle: 10 degrees).

With decrease in the L-value measured, the degree of black color increases, so that the outer surface film has less impact on the printing appearance. With increase in the L-value, the degree of black color decreases, so that the outer surface film whitened has bad effect on the printing appearance.

In practical use of a metal can composed of a metal plate having an L-value of a part printed in black of 14.0 laminated with an outer surface film, the L-value is preferably less than 30, more preferably less than 20, still more preferably less than 16.

Example 1

A mixture of dry-blended 60 parts by mass of polyester (A-1), 40 parts by mass of polyester (B-1), and 0.08 mass % of agglomerated silica having an average particle size of 2.5 μm was extruded into a sheet form at 275° C. for a retention time of 8 minutes using an extruder having a T-die, and solidified by quenching to obtain an unstretched sheet such that the film after stretching had a thickness of 12 μm.

Next, the resulting unstretched sheet was successively stretched by biaxial stretching. First, a first-stage MD stretching was performed at a magnification of 1.15 and then a second-stage MD stretching was continuously performed at a magnification of 3.00 to have an MD stretching magnification (X) of 3.45 by a longitudinal stretching machine. The stretching temperature was 70° C. in both the first-stage MD stretching and the second-stage MD stretching. Further, the ends of the MD-stretched film were gripped by clips of a tenter-type transverse stretching machine and stretched to have a TD stretching magnification (Y) of 3.70. As a result of these stretchings, the stretching magnification ratio (X/Y) was 0.93 and the area magnification (X×Y) was 12.77.

Next, after subjected to a heat relaxation treatment at a heat relaxation temperature controlled to 160° C. with a relaxation rate in TD controlled to 5.0% for 4 seconds, the film was cooled to room temperature and wound into a roll form to obtain a polyester film having a thickness of 12 μm.

Examples 2 to 32 and Comparative Examples 1 to 16

A polyester film was obtained in the same manner as in Example 1, except that the types of polyester (A) and polyester (B), the mass ratio between them, and conditions in the sheet forming step, the stretching step and the heat relaxation step were changed as shown in Tables 1, 4 and 7.

The characteristics of the resulting polyester films are shown in Tables 2 to 3, 5 to 6, and 8 to 9.

TABLE 1

| | | Polyester | | | Sheet forming step | | | Stretching step MD stretching | | | | |
|---|---|---|---|---|---|---|---|---|---|---|---|---|
| | | | | | Extrusion | | | Stretching condition in each stage | | | | |
| | | | | | | | | First stage (MD1) | Second stage (MD2) | Third stage (MD3) | | |
| | | Type | | Mass Ratio | temper-ature | Retention time | Temper-ature | Magnifi-cation | Magnifi-cation | Magnifi-ratio | Magnification ratio | |
| | | A | B | (A/B) | (° C.) | (min) | (° C.) | X3/X2 | X3/X2 | X3/X2 | X2/X1 | X3/X2 |
| Example | 1 | A-1 | B-1 | 60/40 | 275 | 8 | 70 | — | 3.00 | — | 2.61 | — |
| | 2 | A-1 | B-1 | 60/40 | 275 | 8 | 70 | 1.33 | 1.50 | 2.00 | 1.30 | 1.33 |
| | 3 | A-1 | B-1 | 70/30 | 275 | 8 | 70 | — | 3.00 | — | 2.61 | — |
| | 4 | A-1 | B-1 | 55/45 | 275 | 8 | 70 | — | 3.00 | — | 2.61 | — |
| | 5 | A-1 | B-1 | 60/40 | 275 | 8 | 70 | — | 2.80 | — | 2.43 | — |
| | 6 | A-1 | B-1 | 60/40 | 275 | 8 | 70 | — | 2.60 | — | 2.00 | — |
| | 7 | A-1 | B-1 | 60/40 | 275 | 8 | 70 | — | 1.90 | — | 1.06 | — |
| | 8 | A-1 | B-1 | 60/40 | 275 | 8 | 70 | — | 2.90 | — | 2.52 | — |
| | 9 | A-1 | B-1 | 60/40 | 275 | 8 | 70 | — | 2.50 | — | 1.72 | — |
| | 10 | A-1 | B-1 | 60/40 | 275 | 8 | 70 | — | 3.30 | — | 3.00 | — |
| | 11 | A-1 | B-1 | 60/40 | 275 | 8 | 70 | — | 3.40 | — | 2.96 | — |
| | 12 | A-1 | B-1 | 60/40 | 275 | 8 | 70 | — | 3.15 | — | 2.63 | — |
| | 13 | A-1 | B-1 | 60/40 | 275 | 8 | 70 | — | 3.60 | — | 3.19 | — |
| | 14 | A-1 | B-1 | 60/40 | 275 | 8 | 70 | — | 1.15 | — | 0.38 | — |
| | 15 | A-1 | B-1 | 60/40 | 275 | 8 | 70 | — | 3.00 | — | 2.61 | — |
| | 16 | A-1 | B-1 | 60/40 | 275 | 8 | 70 | — | 3.00 | — | 2.61 | — |

| | | Stretching step | | | | | | |
|---|---|---|---|---|---|---|---|---|
| | | MD stretching | TD stretching | | | | | |
| | | MD stretching magnifi-cation (X) | Temper-ature (° C.) | TD stretching magnifi-cation (Y) | Stretching magnifi-cation ratio (X/Y) | Area magnifi-cation (X × Y) | Heat relaxation treatment step Temperature (° C.) | |
| Example | 1 | 3.45 | 85 | 3.70 | 0.93 | 12.77 | 160 | |
| | 2 | 3.45 | 85 | 3.70 | 0.93 | 12.77 | 160 | |
| | 3 | 3.45 | 85 | 3.70 | 0.93 | 12.77 | 160 | |
| | 4 | 3.45 | 85 | 3.70 | 0.93 | 12.77 | 160 | |
| | 5 | 3.22 | 85 | 3.90 | 0.83 | 12.56 | 160 | |
| | 6 | 3.38 | 85 | 3.90 | 0.87 | 13.18 | 160 | |
| | 7 | 3.42 | 85 | 3.70 | 0.92 | 12.65 | 160 | |
| | 8 | 3.34 | 85 | 3.60 | 0.93 | 12.01 | 160 | |
| | 9 | 3.63 | 85 | 3.70 | 0.98 | 13.41 | 160 | |
| | 10 | 3.63 | 85 | 3.70 | 0.98 | 13.43 | 160 | |
| | 11 | 3.91 | 85 | 4.00 | 0.98 | 15.64 | 160 | |
| | 12 | 3.78 | 85 | 3.50 | 1.08 | 13.23 | 160 | |
| | 13 | 4.07 | 85 | 3.70 | 1.10 | 15.05 | 160 | |
| | 14 | 3.45 | 85 | 3.70 | 0.93 | 12.77 | 160 | |
| | 15 | 3.45 | 85 | 3.70 | 0.93 | 12.77 | 160 | |
| | 16 | 3.45 | 98 | 3.70 | 0.93 | 12.77 | 160 | |

TABLE 2

| | | Characteristics of polyester film | | | | | | | | | | | |
|---|---|---|---|---|---|---|---|---|---|---|---|---|---|
| | | Thickness | | Dry heat shrinkage rate (%) | | | | | | | | | Melting point |
| | | | Thickness | 160° C. × 30 min | | | | | 200 C. × 15 min | | | | |
| | | Average (μm) | variation (%) | MD | 45° | TD | 135° | Maximum − Mimmum | MD | 45° | TD | 135° | Maximum − Minimum | (° C.) A/B |
| Example | 1 | 12.34 | 3.5 | 15.0 | 15.1 | 14.8 | 14.8 | 0.3 | 27.1 | 27.2 | 26.4 | 27.6 | 1.2 | 220/250 |
| | 2 | 12.42 | 2.3 | 15.0 | 14.7 | 14.5 | 14.8 | 0.5 | 27.3 | 27.2 | 26.3 | 27.5 | 1.2 | 220/250 |
| | 3 | 12.13 | 3.6 | 16.9 | 15.9 | 15.7 | 16.8 | 1.2 | 25.8 | 25.0 | 24.1 | 25.6 | 1.7 | 220/250 |
| | 4 | 12.25 | 3.9 | 17.1 | 16.9 | 16.4 | 17.5 | 1.1 | 23.8 | 22.5 | 20.8 | 24.8 | 4.0 | 220/250 |
| | 5 | 11.31 | 7.8 | 13.8 | 15.3 | 17.3 | 15.6 | 3.5 | 26.5 | 28.0 | 31.0 | 28.3 | 4.5 | 220/250 |
| | 6 | 12.23 | 3.2 | 14.3 | 15.2 | 17.0 | 14.9 | 2.7 | 25.3 | 27.5 | 28.5 | 27.3 | 3.2 | 220/250 |

TABLE 2-continued

| | | Characteristics of polyester film | | | | | | | | | | | |
|---|---|---|---|---|---|---|---|---|---|---|---|---|
| | | Thickness | | Dry heat shrinkage rate (%) | | | | | | | | | Melting |
| | | | | 160° C. × 30 min | | | | | 200 C. × 15 min | | | | point |
| | Average | Thickness variation | | | | | Maximum − Minimum | | | | | Maximum − Minimum | (° C.) |
| | (μm) | (%) | MD | 45° | TD | 135° | | MD | 45° | TD | 135° | | A/B |
| 7 | 12.34 | 7.3 | 15.3 | 15.1 | 14.8 | 15.0 | 0.5 | 27.4 | 27.0 | 26.2 | 26.9 | 1.2 | 220/250 |
| 8 | 12.12 | 8.9 | 15.6 | 14.8 | 13.8 | 15.1 | 1.8 | 24.1 | 22.2 | 20.8 | 22.5 | 3.3 | 220/250 |
| 9 | 11.95 | 2.8 | 16.0 | 15.3 | 14.1 | 15.0 | 1.9 | 28.0 | 27.0 | 26.2 | 27.3 | 1.8 | 220/250 |
| 10 | 11.95 | 7.8 | 15.4 | 14.8 | 14.2 | 15.0 | 1.2 | 30.2 | 29.2 | 27.0 | 29.6 | 3.2 | 220/250 |
| 11 | 12.05 | 5.3 | 19.2 | 17.8 | 15.3 | 17.6 | 3.9 | 34.9 | 34.8 | 31.5 | 34.0 | 3.4 | 220/250 |
| 12 | 12.12 | 3.4 | 18.7 | 15.3 | 13.9 | 15.8 | 4.8 | 32.1 | 30.3 | 27.8 | 30.3 | 4.3 | 220/250 |
| 13 | 12.15 | 2.2 | 18.7 | 15.8 | 13.8 | 16.0 | 4.9 | 33.5 | 31.2 | 30.5 | 31.6 | 3.0 | 220/250 |
| 14 | 12.50 | 9.2 | 16.3 | 15.9 | 15.5 | 16.1 | 0.8 | 29.8 | 28.4 | 28.1 | 29.7 | 1.7 | 220/250 |
| 15 | 11.93 | 7.8 | 15.2 | 14.8 | 14.8 | 15.0 | 0.4 | 26.9 | 28.0 | 26.5 | 28.1 | 1.6 | 220/250 |
| 16 | 12.03 | 7.1 | 15.1 | 15.0 | 14.4 | 15.1 | 0.7 | 27.0 | 27.1 | 26.6 | 27.4 | 0.8 | 220/250 |

TABLE 3

| | | Characteristics of polyester film | | | | | | | | |
|---|---|---|---|---|---|---|---|---|---|---|
| | | Adhesiveness (number of test pieces having a peel strength of 2.9N or more) | | | | | | Can-making properties | | |
| | | After processing Thermal lamination temperature | | | After storage test Thermal lamination temperature | | | (Current value, mA) Thermal lamination temperature | | |
| | | 190° C. | 200° C. | 220° C. | 190° C. | 200° C. | 220° C. | 190° C. | 200° C. | |
| Example | 1 | 10 | 10 | 10 | 10 | 10 | 10 | 2.1 | 0.9 | |
| | 2 | 10 | 10 | 10 | 10 | 10 | 10 | 1.6 | 1.6 | |
| | 3 | 10 | 10 | 10 | 9 | 9 | 9 | 2.5 | 1.8 | |
| | 4 | 10 | 10 | 10 | 9 | 10 | 9 | 2.8 | 2.7 | |
| | 5 | 9 | 10 | 8 | 8 | 10 | 8 | 2.3 | 1.1 | |
| | 6 | 10 | 10 | 10 | 10 | 10 | 9 | 1.0 | 0.9 | |
| | 7 | 8 | 10 | 10 | 8 | 10 | 10 | 3.8 | 1.7 | |
| | 8 | 8 | 9 | 10 | 8 | 9 | 10 | 3.8 | 3.2 | |
| | 9 | 10 | 10 | 10 | 10 | 10 | 10 | 2.3 | 0.8 | |
| | 10 | 8 | 10 | 10 | 8 | 10 | 10 | 3.2 | 1.6 | |
| | 11 | 10 | 10 | 8 | 10 | 10 | 8 | 3.3 | 1.5 | |
| | 12 | 9 | 9 | 9 | 9 | 9 | 9 | 3.5 | 1.7 | |
| | 13 | 10 | 10 | 9 | 10 | 10 | 9 | 3.3 | 2.2 | |
| | 14 | 8 | 10 | 9 | 7 | 9 | 9 | 4.3 | 3.9 | |
| | 15 | 8 | 9 | 9 | 8 | 9 | 9 | 4.8 | 4.3 | |
| | 16 | 8 | 9 | 9 | 8 | 9 | 9 | 4.2 | 3.2 | |

| | | Characteristics of polyester film | | | | | | | |
|---|---|---|---|---|---|---|---|---|---|
| | | Can-making properties (Current value, mA) Thermal lamination temperature | Covering properties (Current value, mA) Thermal lamination temperature | | | Transparency L-value of part printed in black Thermal lamination temperature | | | |
| | | 220° C. | 190° C. | 200° C. | 220° C. | 190° C. | 200° C. | 220° C. | |
| Example | 1 | 0.8 | 2.6 | 1.4 | 1.3 | 18.8 | 17.5 | 17.2 | |
| | 2 | 1.5 | 2.1 | 2.1 | 2.0 | 17.8 | 18.1 | 17.9 | |
| | 3 | 2.9 | 3.0 | 2.3 | 3.4 | 25.8 | 22.2 | 25.2 | |
| | 4 | 2.3 | 3.3 | 3.2 | 2.8 | 29.8 | 25.4 | 25.8 | |
| | 5 | 3.3 | 3.3 | 2.1 | 4.3 | 17.5 | 18.0 | 19.3 | |
| | 6 | 1.4 | 1.0 | 0.9 | 1.4 | 17.9 | 17.1 | 17.6 | |
| | 7 | 1.6 | 4.3 | 2.2 | 2.1 | 18.5 | 17.9 | 17.9 | |
| | 8 | 1.8 | 4.9 | 4.2 | 2.8 | 19.2 | 19.0 | 18.5 | |
| | 9 | 1.0 | 3.3 | 1.8 | 2.0 | 17.8 | 17.0 | 17.3 | |
| | 10 | 1.8 | 4.2 | 2.6 | 2.8 | 17.4 | 16.9 | 17.1 | |
| | 11 | 4.2 | 4.8 | 3.0 | 4.9 | 15.3 | 15.1 | 15.8 | |
| | 12 | 4.8 | 4.5 | 2.8 | 4.9 | 15.5 | 15.2 | 16.1 | |
| | 13 | 3.4 | 4.8 | 3.7 | 4.9 | 14.5 | 14.3 | 14.3 | |
| | 14 | 4.1 | 4.8 | 4.4 | 4.6 | 21.8 | 20.8 | 20.5 | |
| | 15 | 3.8 | 4.9 | 4.5 | 3.9 | 27.2 | 26.5 | 26.2 | |
| | 16 | 2.4 | 4.3 | 3.4 | 2.5 | 26.5 | 25.6 | 25.2 | |

TABLE 4

| | | Polyester | | Sheet forming step | | | Stretching step MD stretching | | | | |
|---|---|---|---|---|---|---|---|---|---|---|---|
| | | | | Extrusion | | | Stretching condition in each stage | | | | |
| | | | | | | | First stage (MD1) | Second stage (MD2) | Third stage (MD3) | Magnification ratio | |
| | | Type | Mass Ratio | temperature | Retention time | Temperature | Magnification | Magnification | Magnification | | |
| | | A | B | (A/B) | (° C.) | (min) | (° C.) | (X1) | (X2) | (X3) | X2/X1 | X3/X2 |
| Example | 17 | A-1 | B-2 | 60/40 | 270 | 8 | 70 | 1.15 | 3.00 | — | 2.61 | — |
| | 18 | A-1 | B-2 | 60/40 | 270 | 8 | 70 | 1.15 | 3.00 | — | 2.61 | — |
| | 19 | A-1 | B-2 | 60/40 | 270 | 8 | 70 | 1.15 | 3.00 | — | 2.61 | — |
| | 20 | A-1 | B-2 | 60/40 | 270 | 8 | 70 | 1.15 | 3.00 | — | 2.61 | — |
| | 21 | A-1 | B-3 | 60/40 | 270 | 8 | 70 | 1.15 | 3.00 | — | 2.61 | — |
| | 22 | A-1 | B-3 | 60/40 | 270 | 8 | 70 | 1.15 | 1.40 | 2.15 | 1.22 | 1.54 |
| | 23 | A-1 | B-4 | 60/40 | 260 | 8 | 70 | 1.15 | 3.00 | — | 2.61 | — |
| | 24 | A-1 | B-4 | 60/40 | 260 | 8 | 70 | 1.15 | 1.50 | 2.00 | 1.30 | 1.33 |
| | 25 | A-1 | B-4 | 60/40 | 260 | 8 | 70 | 1.10 | 3.30 | — | 3.00 | — |
| | 26 | A-1 | B-4 | 60/40 | 260 | 8 | 70 | 1.80 | 1.90 | — | 1.06 | — |
| | 27 | A-1 | B-5 | 60/40 | 260 | 5 | 70 | 1.15 | 3.00 | — | 2.61 | — |
| | 28 | A-1 | B-5 | 60/40 | 260 | 5 | 70 | 1.10 | 1.60 | 1.95 | 1.45 | 1.22 |
| | 29 | A-1 | B-5 | 60/40 | 280 | 15 | 70 | 1.15 | 3.00 | — | 2.61 | — |
| | 30 | A-1 | B-6 | 60/40 | 260 | 8 | 70 | 1.15 | 3.00 | — | 2.61 | — |
| | 31 | A-2 | B-1 | 60/40 | 275 | 8 | 70 | 1.15 | 3.00 | — | 2.61 | — |
| | 32 | A-3 | B-1 | 60/40 | 280 | 8 | 70 | 1.15 | 3.00 | — | 2.61 | — |

| | | Stretching step | | | | | | |
|---|---|---|---|---|---|---|---|---|
| | | MD stretching | TD stretching | | | | | |
| | | MD stretching magnification (X) | Temperature (° C.) | TD stretching magnification (Y) | Stretching magnification ratio (X/Y) | Area magnification (X × Y) | Heat relaxation treatment step Temperature (° C.) |
| Example | 17 | 3.45 | 85 | 3.70 | 0.93 | 12.77 | 140 |
| | 18 | 3.45 | 85 | 3.70 | 0.93 | 12.77 | 150 |
| | 19 | 3.45 | 85 | 3.70 | 0.93 | 12.77 | 180 |
| | 20 | 3.45 | 85 | 3.70 | 0.93 | 12.77 | 200 |
| | 21 | 3.45 | 85 | 3.70 | 0.93 | 12.77 | 160 |
| | 22 | 3.46 | 85 | 3.70 | 0.94 | 12.81 | 160 |
| | 23 | 3.45 | 85 | 3.70 | 0.93 | 12.77 | 160 |
| | 24 | 3.45 | 85 | 3.70 | 0.93 | 12.77 | 160 |
| | 25 | 3.63 | 85 | 3.70 | 0.98 | 13.43 | 160 |
| | 26 | 3.42 | 85 | 3.70 | 0.92 | 12.65 | 160 |
| | 27 | 3.45 | 85 | 3.70 | 0.93 | 12.77 | 160 |
| | 28 | 3.43 | 85 | 3.70 | 0.93 | 12.70 | 160 |
| | 29 | 3.45 | 85 | 3.70 | 0.93 | 12.77 | 160 |
| | 30 | 3.45 | 85 | 3.70 | 0.93 | 12.77 | 160 |
| | 31 | 3.45 | 85 | 3.70 | 0.93 | 12.77 | 160 |
| | 32 | 3.45 | 85 | 3.70 | 0.93 | 12.77 | 160 |

TABLE 5

| | | Characteristics of polyester film | | | | | | | | | | | | |
|---|---|---|---|---|---|---|---|---|---|---|---|---|---|---|
| | | Thickness | | Dry heat shrinkage rate (%) | | | | | | | | | | Melting point |
| | | | | 160° C. × 30 min | | | | | 200° C. × 15 min | | | | | |
| | | Average (μm) | Thickness variation (%) | MD | 45° | TD | 135° | Maximum − Minimum | MD | 45° | TD | 135° | Maximum − Minimum | (° C.) A/B |
| Example | 17 | 12.34 | 3.4 | 19.3 | 18.6 | 16.1 | 18.2 | 3.2 | 34.6 | 34.2 | 33.1 | 34.8 | 1.7 | 220/250 |
| | 18 | 12.04 | 3.8 | 18.1 | 17.1 | 15.3 | 16.9 | 2.8 | 33.2 | 32.1 | 30.4 | 31.8 | 2.8 | 220/250 |
| | 19 | 11.89 | 4.3 | 13.4 | 12.2 | 11.2 | 12.8 | 2.2 | 17.2 | 16.4 | 15.6 | 16.5 | 1.6 | 220/250 |

TABLE 5-continued

| | | Characteristics of polyester film | | | | | | | | | | | |
|---|---|---|---|---|---|---|---|---|---|---|---|---|---|
| | | Thickness | | Dry heat shrinkage rate (%) | | | | | | | | | Melting |
| | | | | 160° C. × 30 min | | | | | 200° C. × 15 min | | | | point |
| | | Average (µm) | Thickness variation (%) | MD | 45° | TD | 135° | Maximum − Minimum | MD | 45° | TD | 135° | Maximum − Minimum | (° C.) A/B |
| | 20 | 12.34 | 4.2 | 7.1 | 5.5 | 4.5 | 5.2 | 2.6 | 9.8 | 8.4 | 7.8 | 8.5 | 2.0 | 220/250 |
| | 21 | 12.54 | 6.2 | 17.3 | 17.0 | 16.2 | 16.7 | 1.1 | 33.1 | 32.2 | 31.2 | 31.9 | 1.9 | 217/230 |
| | 22 | 12.07 | 2.5 | 17.2 | 17.1 | 16.0 | 16.7 | 1.2 | 32.9 | 32.5 | 30.8 | 32.0 | 2.1 | 217/230 |
| | 23 | 12.43 | 6.8 | 16.8 | 16.2 | 15.3 | 16.5 | 1.5 | 31.2 | 30.4 | 29.8 | 30.7 | 1.4 | 219/226 |
| | 24 | 12.28 | 2.8 | 16.5 | 15.8 | 15.0 | 16.0 | 1.5 | 31.8 | 30.8 | 30.0 | 30.6 | 1.8 | 219/226 |
| | 25 | 11.76 | 8.2 | 16.4 | 15.5 | 15.0 | 15.8 | 1.4 | 30.8 | 30.4 | 29.5 | 29.9 | 1.3 | 219/226 |
| | 26 | 12.32 | 9.5 | 16.7 | 16.1 | 15.2 | 16.2 | 1.5 | 31.1 | 30.2 | 29.3 | 30.5 | 1.8 | 219/226 |
| | 27 | 11.89 | 7.5 | 15.8 | 15.1 | 14.0 | 14.9 | 1.8 | 30.1 | 29.2 | 28.0 | 29.5 | 2.1 | 220/217 |
| | 28 | 11.87 | 4.3 | 15.6 | 14.9 | 14.2 | 15.2 | 1.4 | 30.3 | 29.6 | 28.4 | 29.5 | 1.9 | 220/217 |
| | 29 | 12.34 | 3.5 | 16.3 | 15.1 | 13.5 | 14.8 | 2.8 | 30.3 | 28.8 | 27.4 | 29.0 | 2.9 | 211/208 |
| | 30 | 12.62 | 7.3 | 17.5 | 17.3 | 16.4 | 17.0 | 1.1 | 34.2 | 33.2 | 31.8 | 33.0 | 2.4 | 218/235 |
| | 31 | 12.28 | 6.4 | 17.0 | 15.5 | 14.9 | 15.3 | 2.1 | 27.1 | 26.0 | 25.0 | 26.3 | 2.1 | 214/247 |
| | 32 | 12.03 | 6.2 | 16.3 | 15.3 | 13.0 | 15.0 | 3.3 | 28.1 | 26.9 | 24.3 | 27.3 | 3.8 | 197/249 |

TABLE 6

| | | Characteristics of polyester film | | | | | | | |
|---|---|---|---|---|---|---|---|---|---|
| | | Adhesiveness (number of test pieces having a peel strength of 2.9N or more) | | | | | | Can-making properties | |
| | | After processing Thermal lamination temperature | | | After storage test Thermal lamination temperature | | | (Current value, mA) Thermal lamination temperature | |
| | | 190° | 200° | 220° | 190° | 200° | 220° | 190° | 200° |
| Example | 17 | 8 | 8 | 8 | 8 | 8 | 8 | 4.2 | 3.8 |
| | 18 | 10 | 10 | 9 | 10 | 10 | 9 | 1.9 | 1.5 |
| | 19 | 10 | 10 | 10 | 10 | 10 | 10 | 1.9 | 1.5 |
| | 20 | 8 | 9 | 8 | 8 | 9 | 8 | 3.5 | 3.0 |
| | 21 | 9 | 10 | 10 | 8 | 8 | 8 | 3.4 | 1.7 |
| | 22 | 10 | 10 | 10 | 10 | 10 | 10 | 0.7 | 0.7 |
| | 23 | 9 | 10 | 9 | 8 | 9 | 8 | 3.1 | 2.5 |
| | 24 | 10 | 10 | 10 | 10 | 10 | 10 | 0.8 | 0.8 |
| | 25 | 8 | 10 | 9 | 8 | 9 | 9 | 4.1 | 1.9 |
| | 26 | 8 | 9 | 9 | 7 | 8 | 8 | 4.3 | 3.3 |
| | 27 | 9 | 10 | 9 | 7 | 8 | 7 | 4.5 | 3.3 |
| | 28 | 10 | 10 | 9 | 9 | 9 | 8 | 2.3 | 1.5 |
| | 29 | 10 | 10 | 10 | 8 | 8 | 8 | 4.8 | 4.2 |
| | 30 | 9 | 10 | 10 | 9 | 10 | 9 | 2.3 | 1.8 |
| | 31 | 10 | 10 | 10 | 9 | 10 | 8 | 1.0 | 1.7 |
| | 32 | 10 | 10 | 9 | 8 | 8 | 7 | 3.5 | 3.5 |

| | | Characteristics of polyester film | | | | | | |
|---|---|---|---|---|---|---|---|---|
| | | Can-making properties (Current value, mA) Thermal lamination temperature | Covering properties (Current value, mA) Thermal lamination temperature | | | Transparency L-value of part printed in black Thermal lamination temperature | | |
| | | 220° | 190° | 200° | 220° | 190° | 200° | 220° |
| Example | 17 | 3.2 | 4.5 | 4.2 | 3.6 | 27.3 | 26.9 | 26.2 |
| | 18 | 3.5 | 2.4 | 2.0 | 4.0 | 17.7 | 17.8 | 18.5 |
| | 19 | 1.5 | 2.4 | 2.0 | 2.0 | 18.3 | 17.9 | 17.8 |
| | 20 | 1.5 | 4.0 | 3.5 | 2.0 | 18.4 | 18.5 | 17.2 |
| | 21 | 2.1 | 3.9 | 2.2 | 2.6 | 19.2 | 17.5 | 17.8 |
| | 22 | 0.8 | 1.2 | 1.3 | 1.3 | 17.1 | 17.4 | 17.5 |
| | 23 | 2.3 | 3.6 | 3.0 | 2.8 | 18.2 | 17.8 | 17.2 |
| | 24 | 0.7 | 1.3 | 1.3 | 1.2 | 17.8 | 17.9 | 17.8 |
| | 25 | 2.8 | 4.9 | 2.9 | 3.8 | 17.7 | 17.1 | 17.4 |
| | 26 | 3.0 | 4.8 | 3.8 | 3.5 | 19.9 | 18.9 | 18.3 |
| | 27 | 3.3 | 4.9 | 3.8 | 3.8 | 20.5 | 19.2 | 19.2 |
| | 28 | 1.5 | 2.8 | 2.0 | 2.0 | 20.1 | 19.5 | 19.6 |
| | 29 | 4.0 | 4.9 | 4.7 | 4.5 | 20.4 | 19.8 | 19.6 |

TABLE 6-continued

| | | | | | | | |
|---|---|---|---|---|---|---|---|
| 30 | 2.6 | 2.8 | 2.3 | 3.1 | 18.8 | 18.7 | 18.8 |
| 31 | 3.3 | 1.5 | 2.2 | 3.8 | 18.9 | 19.8 | 20.2 |
| 32 | 4.8 | 4.0 | 4.0 | 4.9 | 19.5 | 19.5 | 21.1 |

TABLE 7

| | | | Polyester | | Sheet forming step | | Stretching step MD stretching | | | | | |
|---|---|---|---|---|---|---|---|---|---|---|---|---|
| | | | | | | | | | Stretching condition in each stage | | | |
| | | | | | Extrusion | | | First stage (MD1) | Second stage (MD2) | Third stage (MD3) | | |
| | | | Type | Mass Ratio | temperature | Retention time | Temperature | Magnification | Magnification | Magnification | Magnification ratio | |
| | | | A | B | (A/B) | (°C.) | (min) | (°C.) | (X1) | (X2) | (X3) | X2/X3 | X3/X2 |
| Comparative Example | 1 | A-1 | B-1 | 85/15 | 275 | 8 | 70 | 1.15 | 3.00 | — | 2.61 | — |
| | 2 | A-1 | B-1 | 75/25 | 275 | 8 | 70 | 1.15 | 3.00 | — | 2.60 | — |
| | 3 | A-1 | B-1 | 50/50 | 275 | 8 | 70 | 1.15 | 3.20 | — | 2.78 | — |
| | 4 | A-1 | B-1 | 40/60 | 275 | 8 | 70 | 1.25 | 2.80 | — | 2.24 | — |
| | 5 | A-1 | B-1 | 35/65 | 275 | 8 | 80 | 1.15 | 3.00 | — | 2.61 | — |
| | 6 | A-1 | B-1 | 30/70 | 275 | 8 | 85 | 1.15 | 3.00 | — | 2.61 | — |
| | 7 | A-1 | B-1 | 60/40 | 275 | 8 | 70 | 1.15 | 2.80 | — | 2.17 | — |
| | 8 | A-1 | B-1 | 60/40 | 275 | 8 | 70 | 1.20 | 2.90 | — | 2.42 | — |
| | 9 | A-1 | B-1 | 60/40 | 275 | 8 | 70 | 1.20 | 2.50 | — | 2.08 | — |
| | 10 | A-1 | B-1 | 60/40 | 275 | 8 | 110 | 3.39 | — | — | — | — |
| | 11 | A-1 | B-1 | 60/40 | 275 | 8 | 70 | 3.45 | — | — | — | — |
| | 12 | A-1 | B-1 | 60/40 | 275 | 8 | 70 | 1.15 | 3.80 | — | 3.30 | — |
| | 13 | A-1 | B-1 | 60/40 | 275 | 8 | 70 | 1.20 | 3.00 | — | 2.50 | — |
| | 14 | A-1 | B-1 | 60/40 | 275 | 8 | 70 | 1.15 | 3.60 | — | 3.13 | — |
| | 15 | A-1 | B-1 | 60/40 | 275 | 8 | 70 | 1.30 | 2.40 | — | 1.85 | — |
| | 16 | A-1 | B-1 | 60/40 | 275 | 8 | 70 | 1.50 | 2.60 | — | 1.73 | — |

| | | Stretching step | | | | | |
|---|---|---|---|---|---|---|---|
| | | MD stretching | TD stretching | | | | |
| | | MD stretching magnification (X) | Temperature (°C.) | TD stretching magnification (Y) | Stretching magnification ratio (X/Y) | Area magnification (X × Y) | Heat relaxation treatment step Temperature (°C.) |
| Comparative Example | 1 | 3.45 | 85 | 3.70 | 0.93 | 12.77 | 140 |
| | 2 | 3.45 | 85 | 3.70 | 0.93 | 12.77 | 150 |
| | 3 | 3.68 | 85 | 3.55 | 1.04 | 13.96 | 180 |
| | 4 | 3.50 | 85 | 3.60 | 0.97 | 12.60 | 200 |
| | 5 | 3.45 | 85 | 3.70 | 0.93 | 12.77 | 160 |
| | 6 | 3.45 | 85 | 3.70 | 0.93 | 12.77 | 160 |
| | 7 | 2.88 | 85 | 4.20 | 0.68 | 12.08 | 160 |
| | 8 | 3.48 | 85 | 4.70 | 0.74 | 16.36 | 160 |
| | 9 | 3.00 | 85 | 3.80 | 0.79 | 11.40 | 160 |
| | 10 | 3.39 | 80 | 4.25 | 0.80 | 14.41 | 160 |
| | 11 | 3.45 | 85 | 3.70 | 0.93 | 12.77 | 160 |
| | 12 | 4.37 | 85 | 3.80 | 1.15 | 16.61 | 160 |
| | 13 | 3.60 | 85 | 3.00 | 1.20 | 10.80 | 160 |
| | 14 | 4.14 | 85 | 3.20 | 1.29 | 13.25 | 160 |
| | 15 | 3.12 | 85 | 3.50 | 0.89 | 10.92 | 160 |
| | 16 | 3.90 | 85 | 4.20 | 0.93 | 16.38 | 160 |

TABLE 8

| | | Characteristics of polyester film | | | | | | | | | | | |
|---|---|---|---|---|---|---|---|---|---|---|---|---|---|
| | | Thickness | | Dry heat shrinkage rate (%) | | | | | | | | | Melting |
| | | | | 160 C. × 30 min | | | | | 200° C. × 15 min | | | | point |
| | | Average (μm) | Thickness variation (%) | MD | 45° | TD | 135° | Maximum − Minimum | MD | 45° | TD | 135° | Maximum − Minimum | (° C.) A/B |
| Comparative Example | 1 | 11.62 | 7.3 | 15.5 | 15.1 | 14.0 | 14.8 | 1.5 | 25.4 | 24.8 | 24.6 | 25.0 | 0.8 | 215/246 |
| | 2 | 12.31 | 5.2 | 17.0 | 15.0 | 13.5 | 15.5 | 3.5 | 31.5 | 29.2 | 28.8 | 28.9 | 2.7 | 217/248 |
| | 3 | 11.55 | 3.5 | 15.8 | 15.1 | 13.8 | 14.4 | 2.0 | 27.8 | 26.3 | 25.3 | 26.6 | 2.5 | 220/250 |
| | 4 | 12.08 | 3.6 | 15.2 | 14.6 | 14.0 | 14.8 | 1.2 | 26.8 | 25.0 | 24.8 | 25.4 | 2.0 | 220/250 |
| | 5 | 12.32 | 3.2 | 15.8 | 15.3 | 13.3 | 15.0 | 2.5 | 22.9 | 21.5 | 20.8 | 21.8 | 2.1 | 221/253 |
| | 6 | 12.52 | 4.2 | 15.6 | 13.5 | 12.5 | 13.2 | 3.1 | 20.8 | 19.4 | 18.9 | 19.8 | 1.9 | 223/255 |
| | 7 | 12.02 | 9.4 | 11.4 | 15.0 | 19.2 | 15.3 | 7.8 | 21.0 | 27.3 | 35.8 | 26.9 | 14.8 | 220/250 |
| | 8 | 11.95 | 9.6 | 15.0 | 18.2 | 21.3 | 18.8 | 6.3 | 30.2 | 35.3 | 40.2 | 36.2 | 10.0 | 220/250 |
| | 9 | 12.35 | 12.2 | 12.0 | 13.3 | 17.2 | 13.8 | 5.2 | 22.6 | 24.6 | 31.3 | 25.0 | 8.7 | 220/250 |
| | 10 | 11.64 | 4.8 | 12.5 | 18.0 | 14.8 | 19.3 | 6.8 | 29.5 | 39.8 | 37.8 | 33.2 | 10.3 | 220/250 |
| | 11 | 12.08 | 10.4 | 14.8 | 14.2 | 13.9 | 14.6 | 0.9 | 26.3 | 25.2 | 24.6 | 25.4 | 1.7 | 220/250 |
| | 12 | 11.89 | 4.3 | 24.8 | 18.2 | 14.8 | 17.9 | 10.0 | 39.3 | 36.8 | 28.2 | 35.3 | 11.1 | 220/250 |
| | 13 | 12.21 | 14.2 | 16.5 | 14.5 | 11.2 | 14.3 | 5.3 | 28.4 | 24.3 | 20.2 | 23.8 | 8.2 | 220/250 |
| | 14 | 12.15 | 4.3 | 23.7 | 18.0 | 12.8 | 18.4 | 10.9 | 42.3 | 35.4 | 22.3 | 33.9 | 20.0 | 220/250 |
| | 15 | 11.96 | 11.5 | 13.3 | 13.0 | 12.8 | 12.5 | 0.8 | 24.1 | 22.9 | 22.4 | 23.0 | 1.7 | 220/250 |
| | 16 | 12.00 | 2.1 | 22.3 | 19.2 | 18.2 | 18.8 | 4.1 | 40.3 | 37.2 | 35.1 | 37.0 | 5.2 | 220/250 |

TABLE 9

| | | Characteristics of polyester film | | | | | | | | |
|---|---|---|---|---|---|---|---|---|---|---|
| | | Adhesiveness (number of test pieces having a peel strength of 2.9N or more) | | | | | | Can-making properties | | |
| | | After processing Thermal lamination temperature | | | After storage test Thermal lamination temperature | | | (Current value, mA) Thermal lamination temperature | | |
| | | 190° C. | 200° C. | 220° C. | 190° C. | 200° C. | 220° C. | 190° C. | 200° C. | |
| Comparative Example | 1 | 10 | 10 | 9 | 4 | 4 | 2 | 1.8 | 2.1 | |
| | 2 | 10 | 10 | 10 | 8 | 8 | 8 | 2.8 | 2.5 | |
| | 3 | 10 | 10 | 10 | 9 | 10 | 9 | 1.8 | 1.1 | |
| | 4 | 10 | 10 | 10 | 9 | 10 | 10 | 2.0 | 1.0 | |
| | 5 | 8 | 8 | 10 | 8 | 8 | 10 | 4.3 | 3.8 | |
| | 6 | 3 | 6 | 6 | — | 3 | 3 | 7.2 | 6.8 | |
| | 7 | 6 | 6 | 4 | 5 | 4 | — | 5.2 | 4.3 | |
| | 8 | 2 | 2 | 3 | — | — | — | 6.7 | 6.5 | |
| | 9 | 2 | 4 | 2 | — | — | — | 7.3 | 6.5 | |
| | 10 | 6 | 4 | 4 | 4 | 3 | 3 | 6.2 | 6.9 | |
| | 11 | 4 | 10 | 7 | — | 10 | 7 | 6.2 | 2.8 | |
| | 12 | 6 | 5 | 3 | 6 | — | — | 4.1 | 5.9 | |
| | 13 | 3 | 4 | 3 | — | — | — | 6.3 | 5.8 | |
| | 14 | 6 | 5 | 1 | 6 | — | — | 4.2 | 5.2 | |
| | 15 | 3 | 9 | 7 | — | 9 | 7 | 5.5 | 3.2 | |
| | 16 | 8 | 7 | 4 | 7 | 6 | — | 3.3 | 2.3 | |

| | | Characteristics of polyester film | | | | | | |
|---|---|---|---|---|---|---|---|---|
| | | Can-making properties (Current value, mA) Thermal lamination temperature | Covering properties (Current value, mA) Thermal lamination temperature | | | Transparency L-value of part printed in black Thermal lamination temperature | | |
| | | 220° C. | 190° C. | 200° C. | 220° C. | 190° C. | 200° C. | 220° C. |
| Comparative Example | 1 | 4.2 | 9.8 | 9.2 | 9.7 | 30.8 | 32.8 | 42.0 |
| | 2 | 3.2 | 8.8 | 7.3 | 8.8 | 32.5 | 30.8 | 39.2 |
| | 3 | 1.5 | 7.9 | 7.5 | 8.1 | 38.2 | 30.8 | 30.9 |
| | 4 | 0.8 | 8.8 | 7.8 | 8.5 | 45.5 | 41.4 | 34.5 |
| | 5 | 1.5 | 9.2 | 8.8 | 9.1 | 48.2 | 45.2 | 39.8 |
| | 6 | 4.8 | 9.6 | 8.1 | 8.5 | 41.5 | 38.9 | 34.5 |
| | 7 | 6.8 | 8.2 | 7.3 | 9.8 | 32.4 | 30.1 | 34.8 |
| | 8 | 5.9 | 11.7 | 11.5 | 10.9 | 32.8 | 32.0 | 30.7 |
| | 9 | 7.7 | 12.3 | 11.5 | 12.7 | 41.8 | 31.8 | 42.8 |
| | 10 | 6.8 | 9.2 | 9.9 | 9.8 | 34.5 | 38.0 | 38.3 |
| | 11 | 5.2 | 6.8 | 3.0 | 5.5 | 31.5 | 29.8 | 30.5 |

TABLE 9-continued

| 12 | 6.3 | 9.1  | 10.9 | 11.3 | 30.4 | 32.8 | 35.4 |
| 13 | 6.0 | 11.3 | 10.8 | 11.0 | 32.9 | 30.1 | 30.8 |
| 14 | 6.9 | 6.2  | 7.2  | 8.9  | 33.8 | 34.8 | 36.6 |
| 15 | 4.3 | 7.5  | 5.2  | 6.3  | 36.6 | 28.4 | 28.6 |
| 16 | 6.0 | 5.3  | 4.3  | 8.0  | 25.6 | 25.1 | 36.7 |

The polyester film obtained in each of Examples 1 to 32 had a mass ratio between the polyester (A) composed mainly of polybutylene terephthalate and the polyester (B) composed mainly of polyethylene terephthalate, dry heat shrinkage rates in four directions, a difference between the maximum value and the minimum value of dry heat shrinkage rates in four directions, and a thickness variation in the ranges specified in the present invention, enabling thermal lamination in a wide temperature range, and having excellent adhesiveness to a metal plate, excellent can-making properties and excellent transparency after can-making. Further, even subjected to long-term storage after retort treatment, the polyester film had excellent adhesiveness to a metal plate and also excellent covering properties.

In particular, the films in Examples 2, 22, 24 and 28 subjected to MD stretching in 3 stages had improved thickness variation in comparison with the films in Examples 1, 21, 23 and 27 subjected to 2-stage MD stretching, so that the adhesiveness, can-making properties and covering properties were further improved before and after storage.

The film in Example 13 had the most suitable conditions of the stretching magnification ratio and the area magnification for use as an outer surface film, so that the transparency after can-making required for an outer surface film of a metal can was the highest.

The film in Example 6 had the most suitable conditions of the stretching magnification ratio and the area magnification for use as an inner surface film, so that the covering properties in long-term storage after retort treatment required for an inner surface film of a metal can were the highest without increase in faults even in long-term storage after retort treatment.

In contrast, the films in Comparative Examples 1 and 2 had a proportion of the polyester (A) in the total mass of the polyester (A) and the polyester (B) of more than 70 mass %, so that the covering properties in long-term storage after retort treatment and the transparency after can-making were poor. The film in Comparative Example 1 had also poor adhesiveness in long-term storage after retort treatment.

The films in Comparative Examples 3 to 6 had a proportion of the polyester (B) of more than 45 mass %, so that the transparency after can-making was low, and the covering properties in long-term storage after retort treatment were poor. The film in Comparative Example 6 had poor adhesiveness between the film and a metal plate in lamination with a metal plate at low temperature.

The film in Comparative Example 11 subjected to one-stage MD stretching had a thickness variation exceeding the range specified in the present invention, so that the adhesiveness was poor in thermal lamination at low temperature, and the can-making properties, the covering properties and the transparency were poor in thermal lamination not only at low temperature but also at high temperature.

The films in Comparative Examples 7, 10 and 14 had a stretching magnification ratio not satisfying the range specified in the present invention, so that the dry heat shrinkage rate exceeded the range specified in the present invention, and the difference between the maximum value and the minimum value of the dry heat shrinkage rate was not able to satisfy the range specified in the present invention. As a result, in the case of high thermal lamination temperature, the films were poor in adhesiveness, can-making properties, covering properties, and transparency after can-making.

The films in Comparative Examples 8 to 9 and 12 to 13, not only the stretching magnification ratio but also the area magnification did not satisfy the range specified in the present invention, so that not only the difference between the maximum value and the minimum value of the dry heat shrinkage rate but also the dry heat shrinkage rates in four directions were not able to satisfy the range specified in the present invention in some cases. As a result, the films were poor in adhesiveness, can-making properties, covering properties, and transparency after can-making.

The film in Comparative Example 15 had an area magnification less than the range specified in the present invention, and a thickness variation more than the range specified in the present invention, so that in thermal lamination at low temperature, the film was poor in adhesiveness, can-making properties, covering properties, and transparency after can-making.

The film in Comparative Example 16 had an area magnification more than the range specified in the present invention, so that the difference between the maximum value and the minimum value of the dry heat shrinkage rate was more than the range specified in the present invention. As a result, in thermal lamination at high temperature, the film was poor in adhesiveness, can-making properties, covering properties, and transparency after can-making.

The invention claimed is:

1. A biaxially successively stretched single-layer polyester film consisting of:
    a polyester (A) which is polybutylene terephthalate consisting of
        88 mol % or more of butylene terephthalate units and 12 mol % or less of sebacic acid units,
    a polyester (B) which is polyethylene terephthalate consisting of
        88 mol % or more of ethylene terephthalate units and 12 mol % or less of isophthalic acid units,
        or
        96.5 mol % or more of ethylene terephthalate units and 3.5 mol % or less of 1,4-cyclohexane dimethanol units,
    an inorganic lubricant in an amount of 0.05 to 0.3 mass %, and
    optionally one or more additives selected from the group consisting of: a catalyst; a reaction inhibitor; an antioxidant; a heat stabilizer; an ultraviolet absorber; and an antistatic agent;
    wherein a mass ratio (A/B) between the polyesters (A) and (B) is 70/30 to 55/45,
    a dry heat shrinkage rate (A) through heat treatment at 160° C. for 30 minutes is 20% or less in any of four directions on a film surface consisting of a 0° direction as an arbitrary direction, and a 45° direction, a 90° direction and a 135° direction clockwise from the 0° direction, and a difference between a maximum value and a minimum value of these dry heat shrinkage rates is 5% or less, a dry heat shrinkage rate (B) through heat treatment at 200° C. for 15 minutes is 35% or less in any of the above four directions, and a difference between a maximum value and a minimum value of these dry heat shrinkage rates is 5% or less, and a thickness variation calculated from the following equation in the above four directions is 10% or less:

$$\text{Thickness variation (\%)} = (T_{max} - T_{min})/T_{ave} \times 100$$

$T_{max}$: maximum thickness in the above four directions of polyester film $T_{min}$: minimum thickness in the above four directions of polyester film $T_{ave}$: average thickness in the above four directions of polyester film, wherein the polyester film is manufactured by a method comprising;

stretching an unstretched sheet in a flow direction of the sheet (MD stretching) and then stretching the same in a width direction (TD stretching), and heat relaxation treating the stretched film at a lateral stretching magnification of 1% to 10% and at a temperature of about 140° C. to about 200° C., wherein the MD stretching is performed in two or more stages such that the MD stretching magnification (X) represented by a product of stretching magnifications in the respective stages in the MD stretching and the TD stretching magnification (Y) satisfy the following conditions:

a stretching magnification ratio (X/Y) of 0.82 to 1.10, and an area magnification (X×Y) of 12.00 to 16.00.

2. The polyester film according to claim 1, wherein the polyester film has melting points in the range of 200 to 223° C. and in the range of 225 to 256° C.

3. A polyester film for lamination on a metal plate, comprising the polyester film of claim 2.

4. A laminated metal plate comprising the polyester film for lamination on a metal plate of claim 3 laminated on the metal plate.

5. A metal container obtained by forming the laminated metal plate of claim 4.

6. A polyester film for lamination on a metal can, comprising the polyester film of claim 2.

7. The polyester film for lamination on a metal can according to claim 6, wherein the polyester film is used for lamination on an inner surface of the metal can.

8. The polyester film for lamination on a metal can according to claim 6, wherein the polyester film is used for lamination on an outer surface of the metal can.

9. A polyester film for lamination on a metal plate, comprising the polyester film of claim 1.

10. A laminated metal plate comprising the polyester film for lamination on a metal plate of claim 9 laminated on the metal plate.

11. A metal container obtained by forming the laminated metal plate of claim 10.

12. A polyester film for lamination on a metal can, comprising the polyester film of claim 1.

13. The polyester film for lamination on a metal can according to claim 5, wherein the polyester film is used for lamination on an inner surface of the metal can.

14. The polyester film for lamination on a metal can according to claim 5, wherein the polyester film is used for lamination on an outer surface of the metal can.

15. The biaxially successively stretched single-layer polyester film of claim 1, wherein the polyester (B) is polyethylene terephthalate consisting of 88 mol % or more of ethylene terephthalate units and 12 mol % or less of isophthalic acid units.

16. The biaxially successively stretched single-layer polyester film of claim 1, wherein the polyester (B) is polyethylene terephthalate consisting of 96.5 mol % or more of ethylene terephthalate units and 3.5 mol % or less of 1,4-cyclohexane dimethanol units.

17. A biaxially successively stretched single-layer polyester film consisting of:

a polyester (A) which is polybutylene terephthalate consisting of
    88 mol % or more of butylene terephthalate units and 12 mol % or less of sebacic acid units, a polyester (B) which is of polyethylene terephthalate consisting of
    88 mol % or more of ethylene terephthalate units and 12 mol % or less of isophthalic acid units,
    or
    96.5 mol % or more of ethylene terephthalate units and 3.5 mol % or less of 1,4-cyclohexane dimethanol units, an inorganic lubricant in an amount of up to about 0.08 mass %, and optionally one or more additives selected from the group consisting of: a catalyst; a reaction inhibitor; an antioxidant; a heat stabilizer; an ultraviolet absorber; and an antistatic agent;

wherein a mass ratio (A/B) between the polyesters (A) and (B) is 70/30 to 55/45, a dry heat shrinkage rate (A) through heat treatment at 160° C. for 30 minutes is 20% or less in any of four directions on a film surface consisting of a 0° direction as an arbitrary direction, and a 45° direction, a 90° direction and a 135° direction clockwise from the 0° direction, and a difference between a maximum value and a minimum value of these dry heat shrinkage rates is 5% or less, a dry heat shrinkage rate (B) through heat treatment at 200° C. for 15 minutes is 35% or less in any of the above four directions, and a difference between a maximum value and a minimum value of these dry heat shrinkage rates is 5% or less, and a thickness variation calculated from the following equation in the above four directions is 10% or less:

$$\text{Thickness variation (\%)} = (T_{max} - T_{min})/T_{ave} \times 100$$

$T_{max}$: maximum thickness in the above four directions of polyester film $T_{min}$: minimum thickness in the above four directions of polyester film $T_{ave}$: average thickness in the above four directions of polyester film, wherein the polyester film is manufactured by a method comprising;

stretching an unstretched sheet in a flow direction of the sheet (MD stretching) and then stretching the same in a width direction (TD stretching), and heat relaxation treating the stretched film at a lateral stretching magnification of 1% to 10% and at a temperature of about 140° C. to about 200° C., wherein the MD stretching is performed in two or more stages such that the MD stretching magnification (X) represented by a product of stretching magnifications in the respective stages in the MD stretching and the TD stretching magnification (Y) satisfy the following conditions:

a stretching magnification ratio (X/Y) of 0.82 to 1.10, and an area magnification (X×Y) of 12.00 to 16.00.

* * * * *